Figure 1:
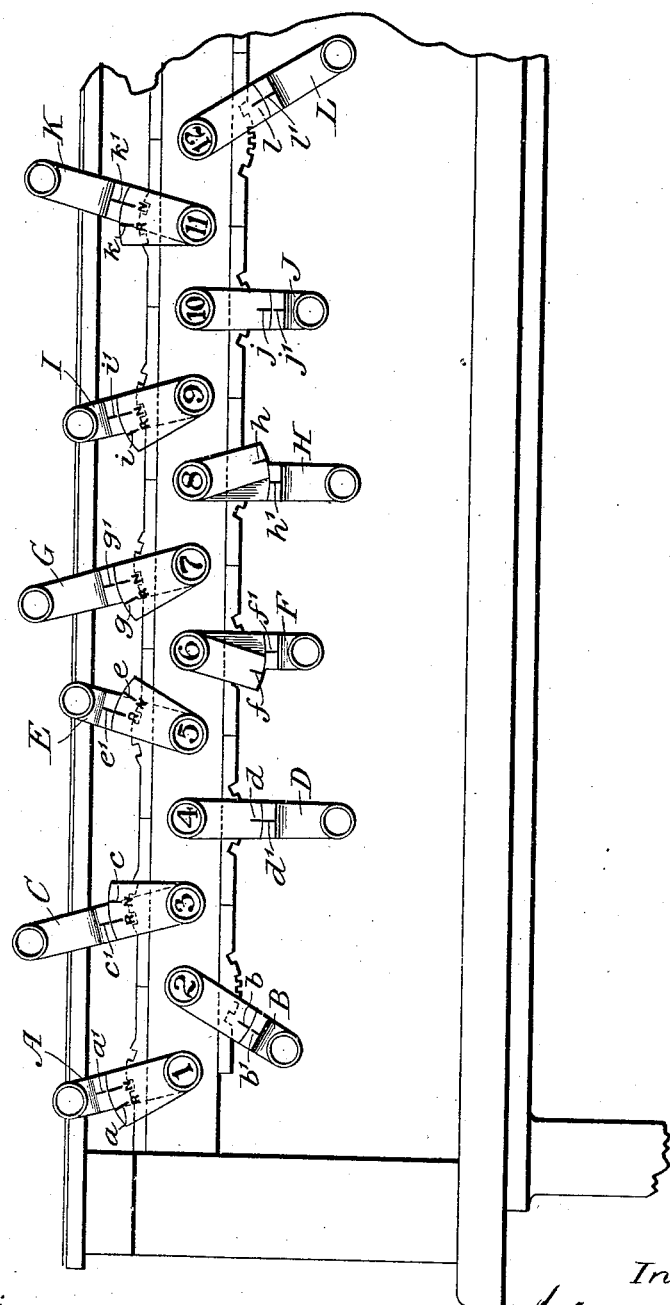

No. 863,237. PATENTED AUG. 13, 1907.
J. D. TAYLOR.
MACHINE FOR CONTROLLING POWER OPERATED APPARATUS CONNECTED WITH RAILWAY SWITCHES AND SIGNALS.
APPLICATION FILED OCT. 26, 1905.

7 SHEETS—SHEET 1.

No. 863,237. PATENTED AUG. 13, 1907.
J. D. TAYLOR.
MACHINE FOR CONTROLLING POWER OPERATED APPARATUS CONNECTED WITH RAILWAY SWITCHES AND SIGNALS.
APPLICATION FILED OCT. 26, 1905.
7 SHEETS—SHEET 2.
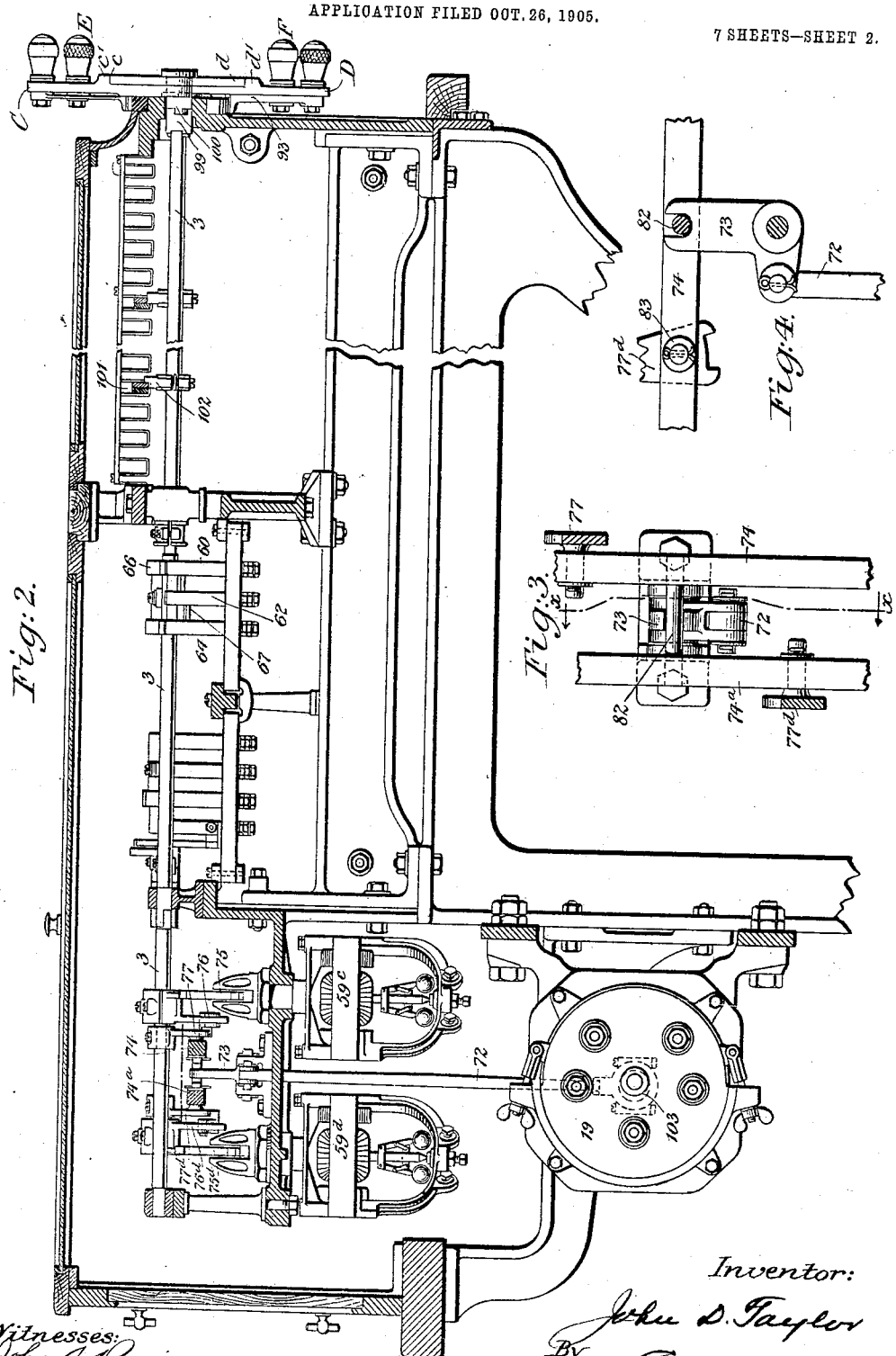

No. 863,237. PATENTED AUG. 13, 1907.
J. D. TAYLOR.
MACHINE FOR CONTROLLING POWER OPERATED APPARATUS CONNECTED WITH RAILWAY SWITCHES AND SIGNALS.
APPLICATION FILED OCT. 26, 1905.
7 SHEETS—SHEET 3.
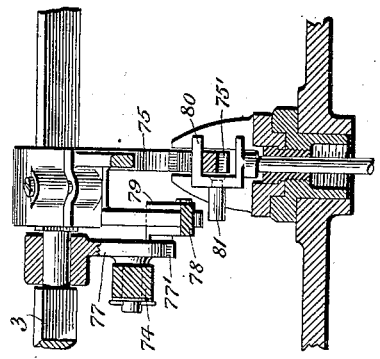
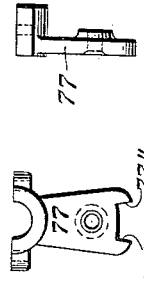
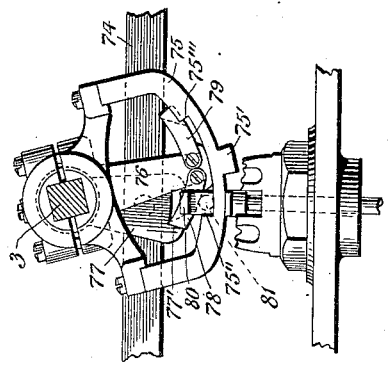
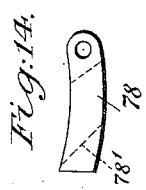
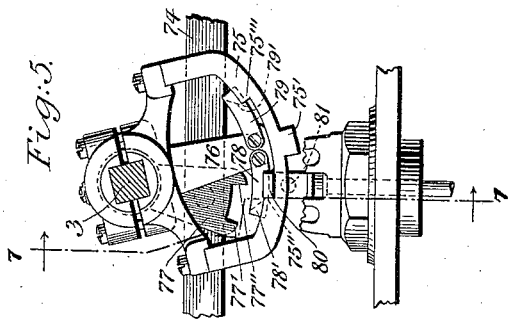
Witnesses:
Inventor:
John D. Taylor
By Geo. E. Cruse
his Attorney No. 863,237. PATENTED AUG. 13, 1907.
J. D. TAYLOR.
MACHINE FOR CONTROLLING POWER OPERATED APPARATUS CONNECTED WITH RAILWAY SWITCHES AND SIGNALS.
APPLICATION FILED OCT. 26, 1905.
7 SHEETS—SHEET 4.
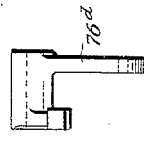
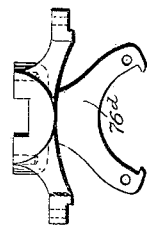
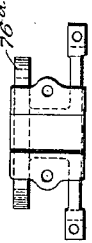
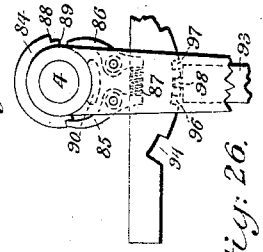
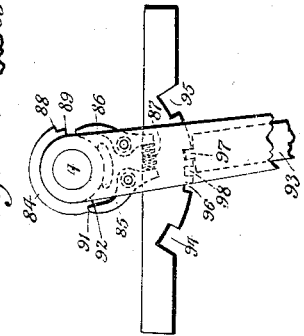
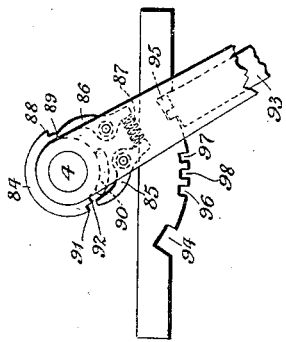
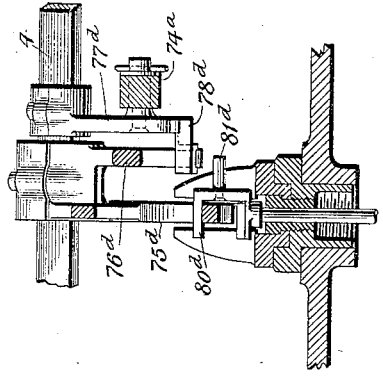
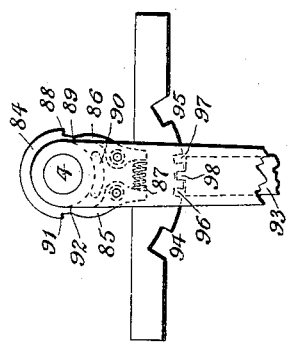
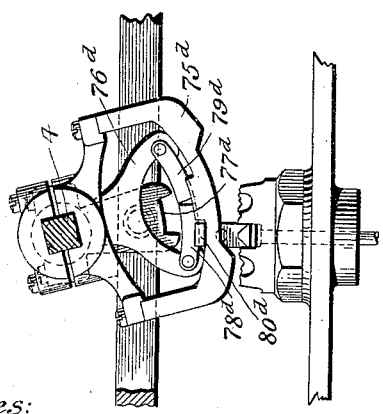
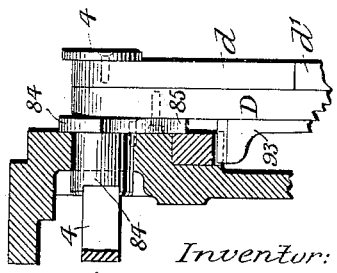
Witnesses:
John A. Rennie
A. Herman Wegner
Inventor:
John D. Taylor
By Geo. E. Cruse
his Attorney No. 863,237.
PATENTED AUG. 13, 1907.
J. D. TAYLOR.
MACHINE FOR CONTROLLING POWER OPERATED APPARATUS CONNECTED WITH RAILWAY SWITCHES AND SIGNALS.
APPLICATION FILED OCT. 26, 1905.
7 SHEETS—SHEET 5.
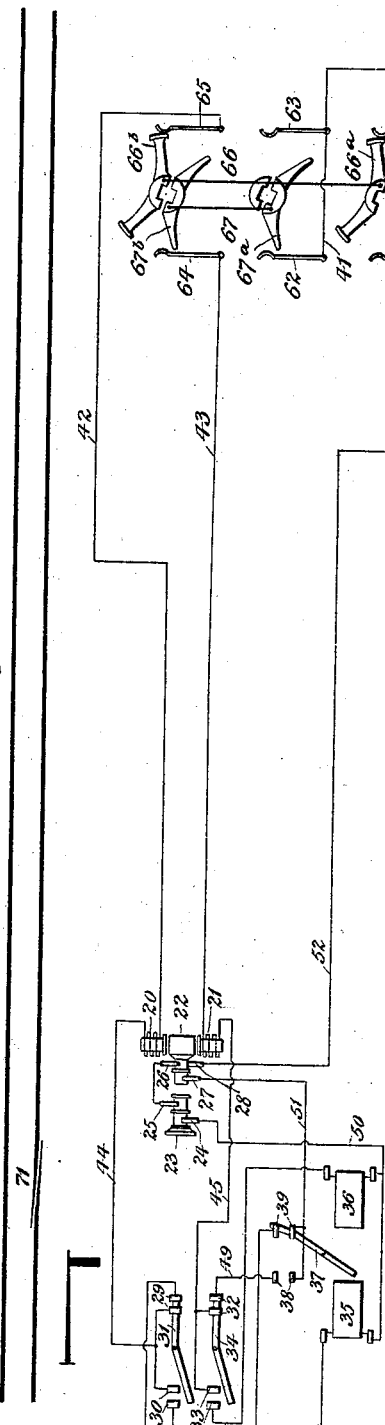
Fig. 28.
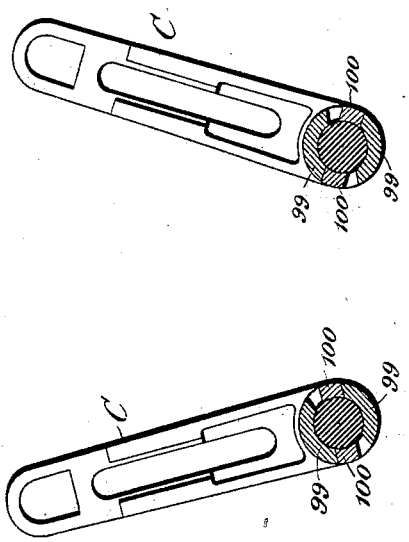
Fig. 30.
Fig. 29.
Witnesses:
Inventor:
John D. Taylor
By
his Attorney.

No. 863,237. PATENTED AUG. 13, 1907.
J. D. TAYLOR.
MACHINE FOR CONTROLLING POWER OPERATED APPARATUS CONNECTED
WITH RAILWAY SWITCHES AND SIGNALS.
APPLICATION FILED OCT. 26, 1905.
7 SHEETS—SHEET 6.
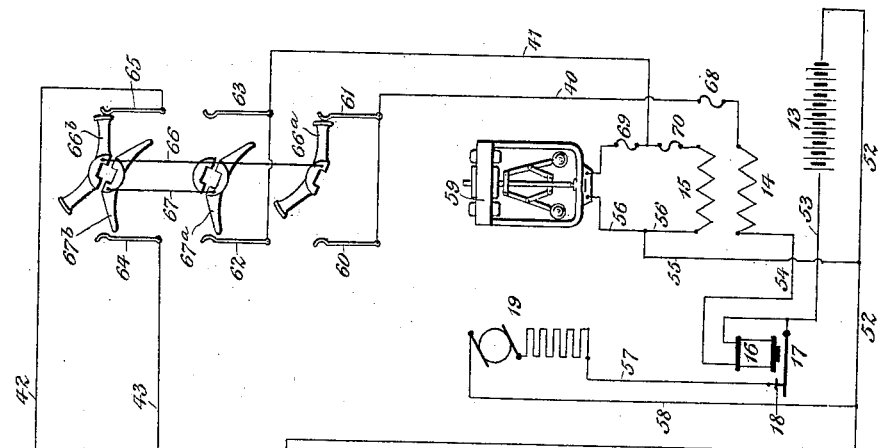
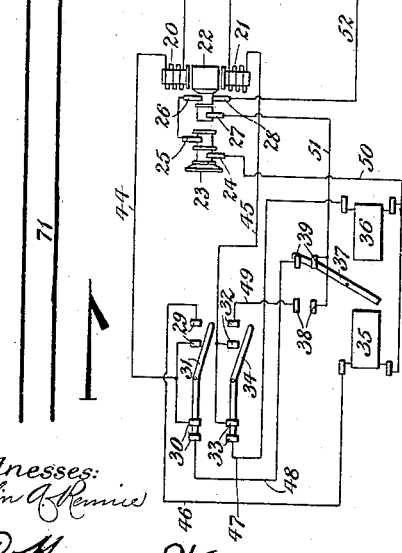
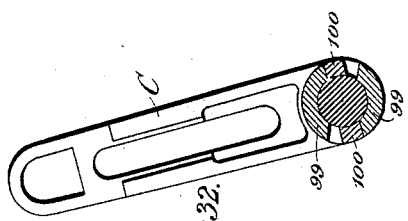
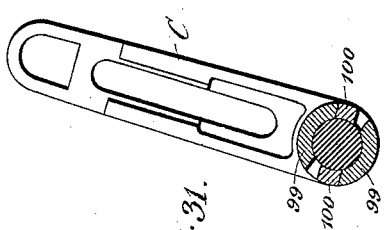
Witnesses:
Inventor:
John D. Taylor
By
his Attorney.

No. 863,237. PATENTED AUG. 13, 1907.
J. D. TAYLOR.
MACHINE FOR CONTROLLING POWER OPERATED APPARATUS CONNECTED WITH RAILWAY SWITCHES AND SIGNALS.
APPLICATION FILED OCT. 26, 1905.

7 SHEETS—SHEET 7.

Witnesses:
Inventor:

UNITED STATES PATENT OFFICE.

JOHN D. TAYLOR, OF WILKINSBURG, PENNSYLVANIA, ASSIGNOR TO THE UNION SWITCH AND SIGNAL COMPANY, OF SWISSVALE, PENNSYLVANIA, A CORPORATION OF PENNSYLVANIA.

MACHINE FOR CONTROLLING POWER-OPERATED APPARATUS CONNECTED WITH RAILWAY SWITCHES AND SIGNALS.

No. 863,237.  Specification of Letters Patent.  Patented Aug. 13, 1907.

Application filed October 26, 1905. Serial No. 284,429.

*To all whom it may concern:*

Be it known that I, JOHN D. TAYLOR, a citizen of the United States, residing at Wilkinsburg, county of Allegheny, and State of Pennsylvania, have invented certain new and useful Improvements in Machines for Controlling Power-Operated Apparatus Connected with Railway Switches and Signals, of which the following is a specification.

My invention relates to machines for controlling power operated apparatus connected with railway switches or signals or both and referred to in the claims as railway parts. Such machines generally comprise levers, mechanical interlocking for the levers and electric locks for each lever. Each lever has, generally, a preliminary, an intermediate, and a final movement. The preliminary movement of a lever is designed to operate that part of the mechanical interlocking associated with it, and through the mechanical interlocking to lock one or more other levers of the system to which it belongs. The preliminary movement also sets the electrical lock which, as is well known, prevents the final movement of the lever which would release one or more other levers of the system. This is all well understood in the art.

My present invention relates more particularly to automatically moving a lever or levers to their final position after their electrical locks have been actuated to release the levers. I preferably employ an electric motor and suitable mechanism for accomplishing this.

I will describe a machine embodying my invention and its connection with suitable power operated apparatus and then point out the novel features thereof in claims.

Figure 34:
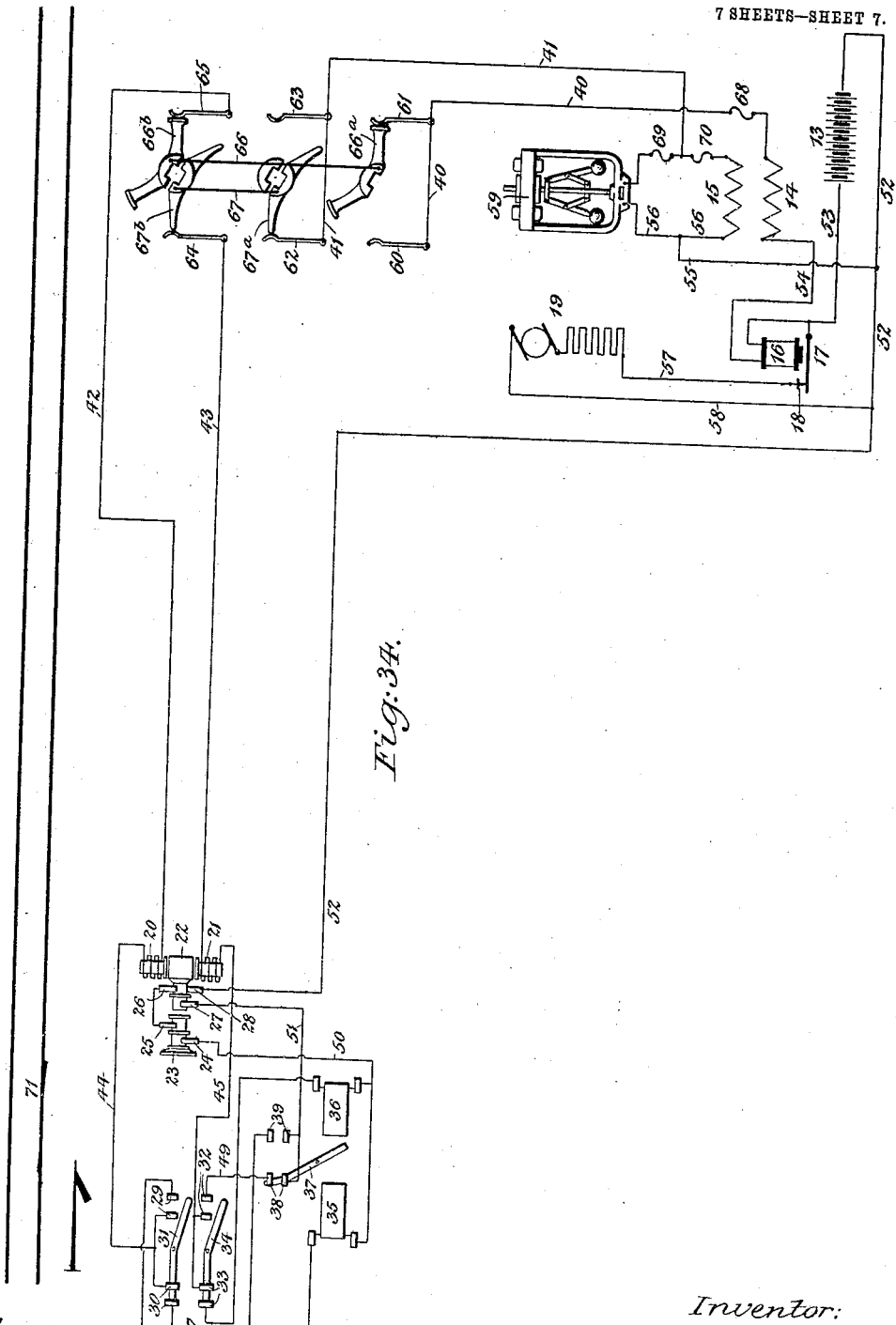

In the accompanying drawings, Figure 1 is a front elevation of part of an interlocking machine embodying my invention. Fig. 2 is a transverse view of the same shown partly in vertical section and embodying my invention. Fig. 3 is a detail plan view of a part of the machine illustrated in Figs. 1 and 2. Fig. 4 is a sectional elevation of Fig. 3, taken along the line $x$—$x$. Figs. 5 to 17, inclusive, are detail views and illustrate parts of the machine of Figs. 1 and 2 as applied to levers controlling switch operating apparatus. Fig. 7 is a vertical section taken on the line 7—7 Fig. 5. Figs. 18 to 27, inclusive, are detail views and illustrate parts of the machine of Figs. 1 and 2 as applied to levers controlling signal operating apparatus. Figs. 28, 33 and 34 are diagrams of circuits for controlling the movements of a single switch. Figs. 29, 30, 31 and 32 are sectional elevations of a switch lever, its shaft and coupling thereto.

Similar letters of reference designate corresponding parts in all of the figures.

Referring now to Fig. 1, the several levers A, B, C, D, etc. are each coupled to horizontal shafts 1, 2, 3, 4 etc., which extend transversely of the machine frame. Each shaft 1, 2, 3, 4, etc. carries a segment of a spur gear 102, (see Fig. 2), which meshes with a rack formed on the under side of a longitudinal locking bar 101, and these locking bars are interlocked with one another by means of transverse locking bars (not shown) which constitutes the mechanical interlocking. This mechanical interlocking may be of any of the well known types and therefore needs no further description. Each shaft also carries a movable part or parts of a circuit controller by means of which the circuits to the switch or signal operating apparatus are controlled.

In Figs. 2, 28, 33 and 34, I have illustrated a form of circuit controller which may be employed. 66 and 67 designate the movable parts and 60, 61, 62, 63, 64 and 65 designate the parts which co-act with the movable parts 66 and 67.

Each switch lever A, C, E, etc. is coupled to its shaft by a coupling which permits of a certain amount of lost motion between the lever and the shaft. In practice I make the lever move through an arc of 45 degrees and allow 15 degrees of lost motion between the lever and the shaft so that the complete movement of the shaft will be through an arc of 60 degrees. While these figures may be departed from in practice, I shall use them for convenience in description.

The rotational movement of each shaft by its lever gives a longitudinal movement to a locking bar 101, and the first part of this movement of the locking bar locks up all other levers whose movements to control switch or signal apparatus would conflict with the switch or signal operated by the lever first moved to its new position; as for instance, when the lever C is moved from left to right to its full extent of 45 degrees, its shaft 3 will be rotated through the same arc and move a locking bar, 101, so as to lock up all levers controlling apparatus whose movements of switches or signals would conflict with the switch or signal apparatus controlled by the lever C. The lost motion between the shaft 3 and the lever C would permit a further movement of 15 degrees of said shaft 3 and further movement of the locking bar, 101, which further movement will release all levers whose movements to control switch or signal apparatus do not conflict with the apparatus operated by the lever C to its new position. The shaft 3, as do all other shafts, also carries a locking member 75, having the shape of a segment of a circle and two shoulders 75″ and 75‴ formed thereon which engage with a latch 80, when the latch is down in its normal position, and thus, prevent the final movement of the shaft to either position and thereby prevent the release of the mechanical locking until such time as the latch 80 is raised out of the path of the said shoulders. The latch 80 is raised at the proper time by the indication motor 59ᵉ, which is excited only after the corresponding track switch has been completely moved over and locked. This indication motor 59ᵉ, here shown, and the lock operated thereby, together with its circuits, is shown and described in my pending application Serial No. 241,473, filed January 17th, 1905, and is here shown merely as a means for raising the latch 80. Any other of the well known means for effecting the same purpose, such as for instance, an electro-magnet might be used in connection with this invention.

Each shaft also carries a fixed arm 76 clamped thereto. A bushing 76ª, one half of which is shown in side elevation in Fig. 11 and in end elevation Fig. 12, intervenes between the arm 76 and the shaft to permit adjustment. The arm 76 is provided at its lower end with two pawls, 78 and 79, and a loosely pivoted arm 77, having two shoulders, 77′ and 77″, capable of engaging with the said pawls. The parts, 77, 76 and 75, with their attachments are more clearly shown in Figs. 5 to 17 inclusive. The latch 80 carries a stud, 81, which projects under one or other of the said pawls, 78 or 79, in such a manner that when the latch 80 is lifted by the motor 59ᵉ being excited, the pawl which happens to be over the stud at the time, is lifted to a position to engage with one of the said shoulders on the arm 77. These arms 77, are connected with a longitudinal bar, 74, running the full length of the machine, and this bar is caused to oscillate longitudinally by means of an electric motor 19, coupled thereto by means of an eccentric 103, the rod 72 and the crank 73. The oscillatory motion of the bar 74 imparts similar motion to each of the arms 77, and when one of the pawls, 78 or 79, is lifted, so as to engage with a shoulder of the arm 77, the shaft, as 3 for instance, will be moved to its final position, thus moving the locking bar 101 to a position to release certain other levers. This final movement of the shaft 3 also takes up all of the lost motion between it and the lever C. The connections between the lever C and shaft 3 are shown in detail in Figs. 29 to 32 inclusive. The part 99 is rigidly connected to the shaft and the lugs 100 are formed on the lever. The lugs 100 engage with notches in the part 99. These notches are made wider by 15 degrees than the lugs. Fig. 29 shows the lever and shaft both in complete reversed position. Fig. 30 shows the lever in normal position but the shaft in the position it has before the indication is received, that is, before the locking has been released. Fig. 31 shows the lever and shaft both in complete normal position. Fig. 32 shows the lever reversed, but shaft not yet having completed its movement.

The description above refers more particularly to the switch lever. The mechanism of the signal lever is somewhat different in construction, due to the fact that the signal lever stands normally in the middle position. A movement to the right from this position is employed to clear a certain signal, while a movement to the left would clear another signal, generally an opposing signal. The details of the signal lever mechanism are shown in Figs. 18 to 26, inclusive. The lever, as D for instance, is pivoted loosely on the shaft 4 and carries two pawls, 85 and 86, which engage with the shoulders 88, 89, 91 or 92, formed on the piece 84, which is attached rigidly to the shaft 4. Fig. 24 shows the lever in a normal position with the pawls 85 and 86 engaging the shoulders 92 and 89 respectively. The lever is locked in the normal position by means of the spring pressed latch 93, engaging with the notch 98 formed in a part fixed to the frame of the machine. When the lever D is moved to the right, as shown in Fig. 25, so that the latch 93 drops into the notch 95 it is in reverse position to the right. In this position the corresponding signal would be cleared. In this position the pawl 85 is thrown out of engagement with the shoulder 92 by means of a lug, 90, fixed to the frame of the machine. On the return movement of the lever towards normal position the pawl 85 passes over the shoulder 92 and engages with the shoulder 91 so that the lever moves through a certain angular distance, say 15 degrees, before it begins to move the shaft 4, and when the lever is back into its normal position the shaft lacks 15 degrees of being normal. It is locked in this position by means of the latch 80ᵈ of the electrical lock engaging with a shoulder on the segment 75ᵈ fixed to the shaft 4. When this latch is raised by the indication motor 59ᵉ it is freed from the shoulder on the segment 75ᵈ, and by means of the stud 81ᵈ, lifts the pawl 78ᵈ, causing it to engage with the arm 77ᵈ, which will move the shaft 4 into its complete normal position. The pawl 85 then drops behind the shoulder 92 preparatory to a reverse movement to the left.

Each lever is provided with an indicator to show whether the shaft has made its complete movement. This indicator, Fig. 1, comprises an arm fixed to the shaft in front of the lever and having a mark or marks thereon which agree with a corresponding mark on the lever when the shaft and lever are both in a complete normal or reverse position. In case of the switch lever, two marks, one indicated by the letter R and the other by the letter N are provided for indicating the normal or reverse position of the shaft. The indicators of the signal lever have only one mark as it is unnecessary to indicate the reverse position of the signal. In Fig. 1, the lever A and its corresponding shaft 1 are both in a complete normal position and the mark designated N on the indicator "a" is in line with the mark a' on the lever A. The lever C is in normal position but its corresponding shaft 3 has not been released to go to the normal position. The mark R coincides with the line c' indicating that so far as the locking which is effective when the lever is reversed is concerned, the lever is still reversed. The lever E and corresponding shaft 5 are both in complete reversed positions and the levers G and I and their corresponding shafts 7 and 9, are both in complete normal position. The lever K is in reversed position with the shaft 11, not yet released. F is a signal lever that has been put normal from the left hand position with its shaft 6, not yet released. H shows a signal lever in a similar condition but having been put normal from the right hand position.

Figs. 28, 33, and 34, are diagrams of the circuits of a single switch or derail movement with its corresponding controller attached to the lever shaft of the interlocking machine, and its indication motor and the circuits by which the stroke completing motor 19, is controlled. Fig. 28 shows the condition of the circuits and controllers at the beginning of the reverse movement. Fig. 33 shows the same at the end of the reverse movement but before the lock has been released. Fig. 34 shows the same with all parts in complete reversed positions. The parts 66$^a$ and 66$^b$ are in reality one piece but are shown separately in elevation for the sake of clearness. The same remarks will apply to the parts 67$^a$ and 67$^b$. When the switch lever is reversed to put the parts of the controller in the position shown in Fig. 28 a circuit from the source of supply here shown as a battery 13 will be completed so that current will flow from the said battery through the wire 53, magnet 16, wire 54, primary coil of the transformer 14, fuse 68, wire 40, brush 61, contact 66$^a$, wire 66, contact 66$^b$, brush 65, wire 42, field coil 20 of the switch operating motor, wire 44, contacts 29, wire 46, magnet 35, wire 50, coil of magnetic clutch 23, brush 26, armature 22 of the switch operating motor, and wire 52, back to battery 13. This current circulating in the coil of magnet 16 energizes it and causes it to lift its armature 17 so as to make contact with stop 18. Another circuit of the battery 13 is thus established which causes current to flow through wire 53, armature 17, stop 18, wire 57, motor 19, wires 58 and 52, back to the battery 13. This energizes the motor 19 causing it to impart a reciprocating motion to the bar 74. When the reverse movement of the switch 71 is completed, the contact arm 31 is separated from the contacts 29 and connects the contacts 30, Fig. 33. This alters the path of the current through the switch operating motor, causing it to flow from wire 44, through contacts 30, wire 48, contacts 39, wire 51, brush 27, armature 22, and wire 52, back to battery 13. The brush 27 bears on a ring connected to one segment of the commutator of the armature 22, which causes an undulating current to flow in the above described circuit as set forth in my pending application, Serial No. 241,473. This undulating current, which is of one sign, still energizes the magnet 16 but it produces undulating magnetism in the core of the transformer by circulating in the coils 14 of the said transformer. This undulating magnetism in the transformer induces an alternating current in the secondary coil 15, which flows through the fuses 70, 69, indication motor 59, and wire 56. This causes the indication motor 59 to rotate and by means of the centrifugal apparatus carried by its armature shaft lifts the latch 80 releasing the segment 75 and causing the latch 79 to engage with the shoulder 77″ on the arm 77, which is in reciprocating motion due to the rotation of the armature of motor 19. The travel of the arm 77 is sufficient to give the final 15 degrees of motion to the shaft of the switch lever. When this final movement takes place the controller attached to the switch lever shaft takes the position as shown in Fig. 34. In this position another circuit of battery 13 is completed so that the current will divide at the brush 27 of the switch operating motor, part returning by the last named circuit and the other part through the armature 22, brushes 26 and 25, coil of clutch 23, brush 24, wire 50, magnet 36, wire 47, contacts 33, wire 45, field coil 21, wire 43, brush 64, movable contact 67$^b$, wire 67, movable contact 67$^a$, brush 62, wire 41, through the indication motor 59 and the secondary coil 15 in parallel, wires 55 and 52 back to the battery 13. This last named current excites the magnet 36, which draws its armature 37 away from the contacts 39 and places it in connection with contacts 38 preparatory to the next or normal movement. Separating the contacts 39 cuts off all current from the battery 13 and the magnet 16 becomes deënergized, its armature 17 then drops away from stop 18 and stops the current through motor 19. It will thus be seen that current is only consumed in motor 19 when it is actually required for doing the work of completing the stroke of the lever shaft.

What I claim as my invention is:

1. In combination with levers of an interlocking machine, of mechanism for locking and releasing the levers, shafts coupled to the levers and adapted to be rotated thereby through a predetermined angle for controlling the movements of railway parts and for actuating the said mechanism to perform a locking function, and means for automatically rotating the shafts through a further angle and thereby actuating the said mechanism to perform a releasing function.

2. In combination with levers of an interlocking machine, of mechanism for locking and releasing the levers, shafts coupled to the levers and adapted to be rotated thereby through a predetermined angle for controlling the movements of railway parts and for actuating the said mechanism to perform a locking function, locking members rigidly connected to the shafts, latches adapted to engage the locking members, electro-magnetic means for moving said latches out of engagement with their respective locking members, a stud forming an integral part of or rigidly connected to each latch, oscillating arms loosely connected to the shafts and provided with lugs or shoulders, arms rigidly connected to the shafts and provided with pawls adapted to be moved by the studs into engagement with the lugs of the oscillating arms when their respective electro-magnetic means are energized, thereby rotating the shafts through a further angle to actuate the locking mechanism to perform a releasing function, and circuits for energizing the said electro-magnetic means, substantially as described.

3. In combination with levers of an interlocking machine, of mechanism for locking and releasing the levers, shafts coupled to the levers and adapted to be rotated thereby through a predetermined angle for controlling the movements of railway parts and for actuating the said mechanism to perform a locking function, locking members rigidly connected to the shafts, and latches adapted to engage the locking members, electro-magnetic means for moving said latches out of engagement with their respective locking members, a stud forming an integral part of or rigidly connected to each latch, oscillating arms loosely connected to the shafts and provided with lugs or shoulders, bars adapted to oscillate longitudinally and pivotally supported by the said oscillating arms, an electric motor and means for converting the rotary movement of the armature of said motor into an oscillatory movement of the said bars, and circuits controlling the said electric motor, the said circuits comprising a source of electric energy and an electro-magnetic circuit controller in circuit therewith.

4. In combination with a lever, a shaft adapted to be rotated on its longitudinal axis by the lever, and a coupling between the lever and the shaft, the said coupling comprising a part rigidly connected to the shaft and means carried by the lever for engaging said rigid part after lost motion, and means for moving the shaft independently of the lever after an operation of the shaft by the lever.

5. In combination with a plurality of levers of an interlocking machine, a plurality of shafts rotatable through a predetermined angle by the said levers, and means for moving the shaft independently of the levers, said means comprising a reciprocating bar, and a coupling between the said bar and shafts.

6. In combination with a lever of an interlocking machine, a shaft to which the lever is coupled and for moving the shaft through a predetermined angle, pawls carried by said lever, a reciprocating bar with which said pawls are adapted to be engaged, and an electric lock for said lever, said lock when actuated being adapted to move either of said pawls into engagement with the reciprocating bar whereby said shaft is given a movement independently of the lever.

7. In combination with levers of an interlocking machine, of mechanism for locking and releasing the levers, shafts coupled to the levers and adapted to be rotated thereby through a predetermined angle for controlling the movements of railway parts and for actuating the said mechanism to perform a locking function, means for limiting the movements of the levers, the said means comprising latches movably attached to the levers, and pieces or parts rigidly attached to the machine or frame having therein recesses for the reception of the said latches, and indicators attached to the levers whereby the positions of levers are indicated, substantially as described and illustrated.

8. In combination with a plurality of interlocked shafts of an interlocking machine, levers for rotating the shafts through a certain angle for effecting the movements of railway parts and for locking certain of said shafts, latches for locking said shafts against further rotation, an oscillating mechanism actuated by a motor, and electromagnetic means for disengaging said latches from said shafts and for connecting said shaft with said oscillating mechanism to cause further rotation of said shafts for releasing certain other of said shafts.

In testimony whereof I have signed my name to this specification in the presence of two subscribed witnesses.

JOHN D. TAYLOR.

Witnesses:
A. HERMAN WEGNER,
HENRY R. BAUER.